(12) United States Patent
Aharchaou et al.

(10) Patent No.: US 11,146,592 B2
(45) Date of Patent: Oct. 12, 2021

(54) ENFORCING UNIVERSAL SECURITY POLICIES ACROSS DATA CENTERS

(71) Applicant: VMware, Inc., Palo Alto, CA (US)

(72) Inventors: Hamza Aharchaou, Redwood City, CA (US); Farzad Ghannadian, Burlingame, CA (US); Amarnath Palavalli, Cupertino, CA (US); Rajiv Krishnamurthy, Los Altos, CA (US)

(73) Assignee: VMware, Inc., Palo Alto, CA (US)

( * ) Notice: Subject to any disclaimer, the term of this patent is extended or adjusted under 35 U.S.C. 154(b) by 343 days.

(21) Appl. No.: 16/249,629

(22) Filed: Jan. 16, 2019

(65) Prior Publication Data
US 2020/0228571 A1 Jul. 16, 2020

(51) Int. Cl.
| | |
|---|---|
| *H04L 12/803* | (2013.01) |
| *G06F 21/62* | (2013.01) |
| *H04L 29/06* | (2006.01) |
| *G06F 9/48* | (2006.01) |
| *H04L 12/801* | (2013.01) |
| *G06F 9/455* | (2018.01) |

(52) U.S. Cl.
CPC ............ *H04L 63/20* (2013.01); *G06F 9/4856* (2013.01); *H04L 63/08* (2013.01); *G06F 9/45558* (2013.01); *G06F 2009/45587* (2013.01); *H04L 63/0218* (2013.01); *H04L 63/0236* (2013.01); *H04L 63/0263* (2013.01)

(58) Field of Classification Search
None
See application file for complete search history.

(56) References Cited

U.S. PATENT DOCUMENTS

| | | | | |
|---|---|---|---|---|
| 8,959,226 | B2* | 2/2015 | Arrowood | H04L 67/1002 709/226 |
| 9,323,459 | B1* | 4/2016 | Marshak | G06F 3/0611 |
| 9,444,847 | B2* | 9/2016 | Zhang | G06F 3/0484 |
| 2010/0049917 | A1* | 2/2010 | Kono | G06F 3/0647 711/114 |
| 2012/0089548 | A1* | 4/2012 | Kobayashi | G06F 3/0647 706/46 |
| 2014/0007134 | A1* | 1/2014 | Fletcher | G06F 9/5094 718/106 |
| 2015/0051942 | A1* | 2/2015 | Franco | H04L 67/1097 705/7.25 |

(Continued)

OTHER PUBLICATIONS

Proactive Workload Management in Hybrid Cloud Computing. Zhang. IEEE. (Year: 2014).*

(Continued)

*Primary Examiner* — Venkat Perungavoor
(74) *Attorney, Agent, or Firm* — Patterson + Sheridan, LLP

(57) ABSTRACT

Embodiments of the present disclosure relate to enforcing universal security policies across data centers. Embodiments include receiving, from a user, a first universal security policy (USP) related to a first universal policy group. Embodiments include identifying a first data center as an enforcement point for the first USP. Embodiments include automatically generating, at the first data center, a first local security policy based on the first USP. Embodiments include deploying a workload associated with the first universal policy group to the first data center. The first USP is enforced for the workload via the first local security policy.

20 Claims, 6 Drawing Sheets

(56) References Cited

U.S. PATENT DOCUMENTS

| | | | | |
|---|---|---|---|---|
| 2015/0249707 A1* | 9/2015 | Morgan | .............. | H04L 67/1002 |
| | | | | 709/226 |
| 2019/0324820 A1* | 10/2019 | Krishnan | .............. | G06F 9/4856 |
| 2020/0127852 A1* | 4/2020 | Liljenstolpe | ............ | H04L 9/006 |
| 2020/0371846 A1* | 11/2020 | Halen | ................... | G06F 9/5027 |

OTHER PUBLICATIONS

Enterprise-Scale Cloud Migration Orchestrator. Hwang. IFIP (Year: 2015).*

Security for the cloud infrastructure: Trusted virtual data center implementation. Berger. IBM. (Year: 2009).*

\* cited by examiner

ENFORCING UNIVERSAL SECURITY POLICIES ACROSS DATA CENTERS

BACKGROUND

Computing, networking, and storage systems such as cloud infrastructure services are increasingly becoming workload-centric. Boundaries between public and private data centers are blurring due to the emergence of hybrid data centers. Accordingly, distinctions between running a workload (e.g., a process, application, virtual machine, or the like) on a private data center and a public data center are increasingly insignificant.

Administrators may secure workloads by using management consoles and/or portals associated with individual data centers to define security policies for the workloads in the data center. Due to differences in the ways that security policies are defined on different types of data centers, these techniques require administrators to acquire a broad knowledge of security infrastructures of different data centers to which workloads are deployed. It is becoming common to have multiple environments (e.g., development, staging, and production) for a given workload, and each environment can span multiple data centers. Furthermore, many public data centers do not support dynamic membership criteria for security groups. As such, it is becoming difficult for administrators to ensure that the same security policies are applied to a workload on every private and/or public data center on which it runs, particularly as dynamic conditions change over time.

Accordingly, there is a need in the art for improved techniques of enforcing security policies for workloads on data centers.

SUMMARY

Herein described are one or more embodiments of a method for enforcing universal security policies across data centers. The method generally includes receiving, from a user, a first universal security policy (USP) related to a first universal policy group; identifying a first data center as an enforcement point for the first USP; automatically generating, at the first data center, a first local security policy based on the first USP; and deploying a workload associated with the first universal policy group to the first data center, wherein the first USP is enforced for the workload via the first local security policy.

Also described herein are embodiments of a computer system, wherein software for the computer system is programmed to execute the method described above for enforcing universal security policies across data centers.

Also described herein are embodiments of a non-transitory computer readable medium comprising instructions to be executed in a computer system, wherein the instructions when executed in the computer system perform the method described above for enforcing universal security policies across data centers.

DETAILED DESCRIPTION

Embodiments presented herein relate to techniques for enforcing universal security policies across data centers. In certain embodiments, a universal security policy (USP) manager allows users to define platform-agnostic security policies centered around workloads regardless of the types of public or private data centers to which the workloads are deployed.

Certain embodiments involve the use of micro-segmentation, in which workloads are segmented into security groups and security policies are associated with the security groups. For instance, a user may define, via the USP manager, a universal security group and a universal security policy associated with the group. Rather than simply defining a list of workloads that are included in the universal security group, the user may define dynamic membership criteria for the universal security group, such as whether or not a workload is tagged with a name of the universal security group. Accordingly, for example, whenever the administrator wants a workload to be included in the universal security group, the administrator simply adds a tag (e.g., metadata) to the workload identifying the name of the universal security group. Tags are only included as one example, and other membership criteria are possible.

The user (e.g., the administrator) only has to define a given universal security policy once, and when a workload is deployed to any particular data center (e.g., a private or public cloud, such as an Amazon Web Services™ (AWS) cloud), the USP manager automatically ensures that the universal security policies associated with the workload's universal security group are applied on the particular data center, thus bringing micro-segmentation to different types of data centers in a seamless fashion. With techniques described herein, the user does not need to learn the security framework of each data center, as the USP manager can automatically implement the universal security policy on a given data center according to the features of the given data center, such as through calls to an application programming interface (API) exposed by a platform management device of the given data center. This provides a level of consistent security enforcement and ease of use that was not previously possible.

Figure 1:
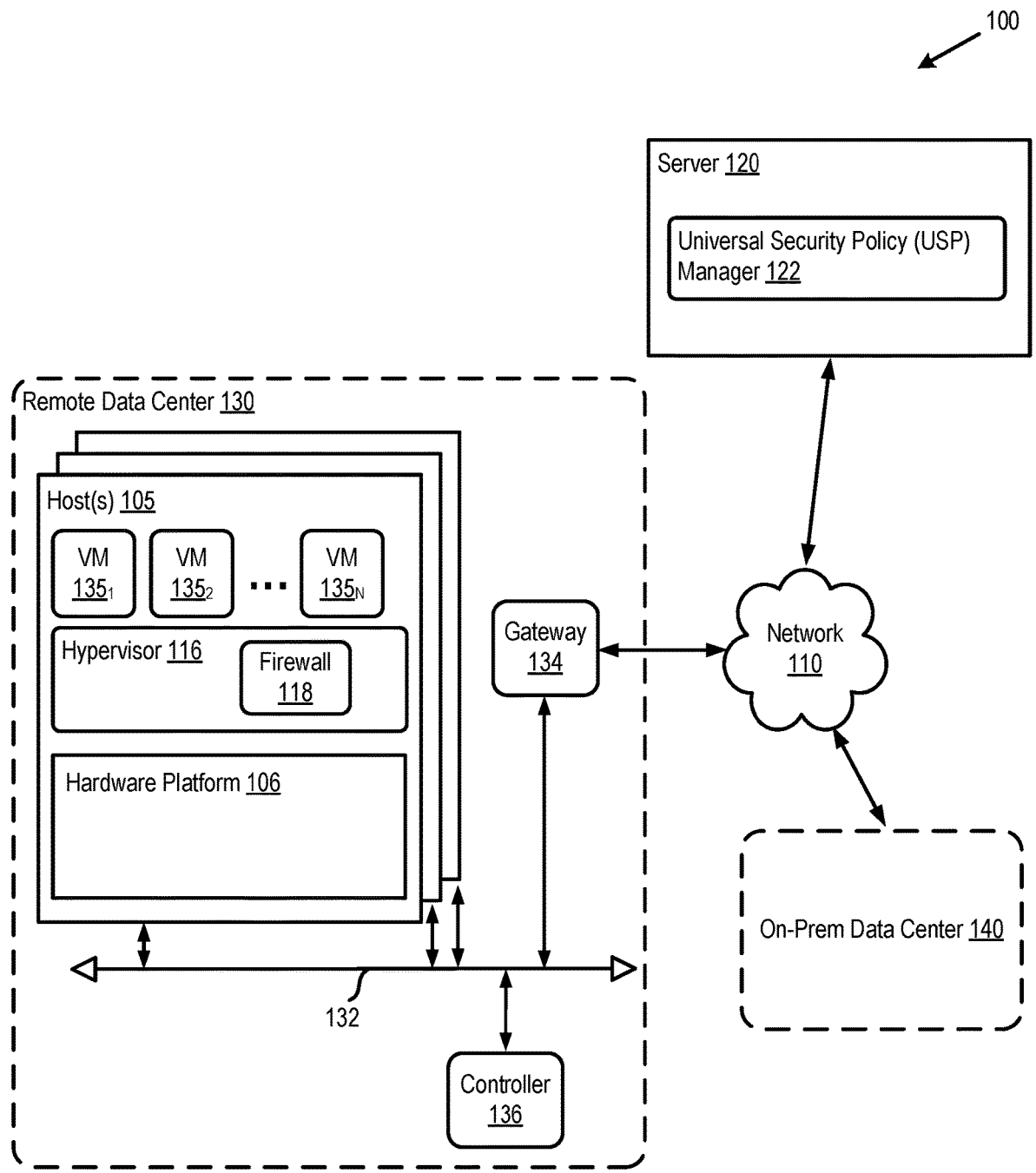
FIG. 1 illustrates components of an example computing environment in which embodiments may be implemented.

FIG. 1 illustrates components of a computing environment 100 in which embodiments of the present disclosure may be implemented. As shown, computing environment 100 includes a server 120, a remote data center 130 and an on-prem (e.g., local) data center 140, which are connected by network 110 (e.g., a direct link, a local area network (LAN), a wide area network (WAN) such as the Internet, another type of network, or a combination of these). Server 120 may comprise one or more physical computing devices (e.g., servers). Server 120 comprises university security policy (USP) manager 122, which performs operations related to enforcing universal security policies across data centers. For example, USP manager 122 allows a user to define universal security groups and universal security policies associated with the universal security groups and then ensures that the universal security policies are enforced for workloads deployed to remote data center 130 and on-prem data center 140 as appropriate, such as by automatically generating local security policies at remote data center 130 and on-prem data center 140 based on the universal security policies.

Remote data center 130 includes host(s) 105, a gateway 134, and a data network 132, which may be a Layer 3 network (internal forwarding devices such as routers and switches not shown). Each of hosts 105 may be constructed on a server grade hardware platform 106, such as an x86 architecture platform. For example, hosts 105 may be geographically co-located servers on the same rack or on different racks. Host 105 is configured to provide a virtualization layer, also referred to as a hypervisor 116, that abstracts processor, memory, storage, and networking resources of hardware platform 106 into multiple virtual machines $135_1$ to $135_N$ (collectively referred to as VMs 135 and individually referred to as VM 135) that run concurrently on the same host. Hypervisor 116 may run on top of the operating system in host 105. In some embodiments, hypervisor 116 can be installed as system level software directly on hardware platform 106 of host 105 (often referred to as "bare metal" installation) and be conceptually interposed between the physical hardware and the guest operating systems executing in the virtual machines. In some implementations, hypervisor 116 may comprise system level software as well as a "Domain 0" or "Root Partition" virtual machine (not shown) which is a privileged machine that has access to the physical hardware resources of the host. In this implementation, one or more of a virtual switch, virtual tunnel endpoint (VTEP), etc., along with hardware drivers, may reside in the privileged virtual machine. Although the disclosure is described with reference to VMs, the teachings herein also apply to other types of virtual computing instances (VCIs), such as containers, Docker containers, data compute nodes, isolated user space instances, namespace containers, and the like. In certain embodiments, VMs 135 may be containers that run on host 105 without the use of a hypervisor.

Hypervisor 116 includes an instance of a firewall 118 (e.g., a distributed firewall that is maintained and controlled across multiple hosts 105 by controller 132) that filters network packets arriving at host 105 and outgoing from host 105. Firewall 118 may comprise multiple software modules for filtering network packets by referencing security or firewall settings of firewall 118. Settings of firewall 118 are determined by rules within controller 132, as discussed further below. In an embodiment, firewall 118 is a firewall internal to remote data center 130 and manages east-west traffic within remote data center 130, i.e., not traffic flowing in and out of remote data center 130.

Gateway 134 provides VMs 135 and other components in remote data center 130 with connectivity to network 110 used to communicate with server 120, on-prem data center 140, or other destinations (not shown) external to remote data center 130. Gateway 134 may be a virtual computing instance, a physical device, or a software module running within host 105. Gateway 134 may manage external public IP addresses for VMs 135 and route traffic incoming to and outgoing from remote data center 130 and provide networking services, such as firewalls, network address translation (NAT), dynamic host configuration protocol (DHCP), and load balancing. Gateway 134 may use data network 132 to transmit data network packets to hosts 105.

Controller 136 manages security settings of firewall 118 within remote data center 130. Controller 136 may be a computer program that resides and executes in a central server in remote data center 130 or, alternatively, controller 136 may run as a virtual appliance (e.g., a VM) in one of hosts 105. Although shown as a single unit, it should be understood that controller 136 may be implemented as a distributed or clustered system. That is, controller 136 may include multiple servers or virtual computing instances that implement controller functions. Controller 136 is associated with one or more virtual and/or physical CPUs (not shown). Processor(s) resources allotted or assigned to controller 136 may be unique to controller 136, or may be shared with other components of remote data center 130. Controller 136 communicates with hosts 105 via management network 132.

Controller 136 includes firewall rules. Controller 136 manages the security settings within firewall 118 based on the firewall rules. Firewall rules specify permissions regarding communication between VMs 135 within remote data center 130. In an embodiment, a rule may be a five-tuple consisting of five parameters: "source," "destination," "application," "action," and "cluster." "Source" and "destination" parameters may be, for example, Internet protocol (IP) addresses specifying a source VM 135 and a destination VM 135. The "application" parameter may specify that the rule applies to packets sent by or from a specific application, such as for example, a specific accounting software application. The "action" parameter may specify what action to take, such as to block (drop) a network packet or allow a network packet. The "cluster" parameter may specify that the rule is to be applied to a specific group (also referred to as a cluster) of hosts 105 or to the whole remote data center 130. Firewall rules may be stored on a storage medium, such as storage particular to controller 136, within hardware platform 106 of one of hosts 105, or that of a data storage service, database, etc., available in remote data center 130.

For example, a firewall rule may specify that all network packets with a source IP address of a first VM 135 and a destination IP address of a second VM 135, sent to or from any application, is to be blocked, and that the rule applies to the first VM 135 and second VM 135 when these VMs are running on any host 105 within remote data center 130. For another example, a rule may specify that that all network packets with a source IP address of a first VM 135 and a destination IP address of a second VM 135, sent to or from a specific accounting software, is to be allowed, and that the rule applies to the first VM 135 and second VM 135 when these VMs are running on one of specified ten hosts 105 within remote data center 130 corresponding to a group.

Firewall rules may be created, changed, and deleted by controller 136, such as by an administrator of remote data center 130 or in response to requests from USP manager 122, as described below. When firewall rules are modified, controller 136 transmits new security settings to firewall 118. In an embodiment, controller 136 transmits new security settings only to the instances of firewall 118 to which the settings apply.

On-prem data center 140 may be substantially similar to remote data center 130. For example, while not depicted in FIG. 1, on-prem data center 140 may comprise hosts, a gateway, a controller, and a data network similarly to remote data center 130. However, on-prem data center 140 may be a different type of data center than remote data center 140. In one example, remote data center 130 is a public data center (e.g., an Amazon Web Services AWS™ cloud), while on-prem data center 140 is a private data center. Alternatively, on-prem data center 140 and remote data center 130 may be the same type of data center.

In certain embodiments, USP manager 122 receives a universal security policy from a user, such as an administrator. In one example, the user provides the universal security policy via a user interface associated with USP manager 122. The universal security policy may, for example, include a rule, such as a rule related to secure shell (SSH) communication (e.g., allowing or disallowing SSH communications to and/or from certain workloads and/or certain universal security groups). In certain embodiments, USP manager 122 may also allow the user to associate the universal security policy with a universal security group. In some embodiments, USP manager 122 allows the user to define enforcement points, such as remote data center 130 and on-prem data center 140. Further, the user may provide credentials related to remote data center 130 and on-prem data center 140 to USP manager 122 so that USP manager 122 can automatically ensure enforcement of universal security policies for workloads deployed on these enforcement points. The user, via the user interface, may define metadata, such as a tag, for a workload in order to associate the workload with a particular universal security group. The metadata may be added directly to the workload or may be stored separately from and associated with the workload (e.g., based on an identifier of the workload).

USP manager 122 determines whether a given workload belongs to a particular universal security group. For instance, USP manager 122 may periodically compare metadata associated with workloads to determine whether the workloads are tagged with the names of universal security groups. For example, VM $135_1$ may be tagged with the name of a universal security group. As such, USP manager 122 ensures that any universal security policies associated with the universal security group are applied to VM $135_1$ on remote data center 130.

USP manager 122 converts user intent into realization by automatically implementing universal security policies, which are platform-agnostic, as platform-specific security policies on individual data centers. For instance, USP manager 122 may communicate with controller 136 of remote data center 130 and a similar controller of on-prem data center 140, such as using APIs exposed by the controllers, to automatically create "local" security policies (e.g., firewall rules) that represent universal security policies in a form that is local to these particular data centers. For example, USP manager 122 may have root access to each of remote data center 130 and on-prem data center 140, meaning it has access to and connection information for platform management devices (e.g., controllers, such as controller 136) in each of the data centers responsible for loading functions onto computing devices of the data centers. USP manager 122 would accordingly send requests (e.g., using any appropriate communication protocol such as HTTP, TCP, etc.) for creating security groups and/or policies to the platform management devices of each of the data centers over network 110. The platform management device in each data center would then create security groups and/or policies for the data center based on the requests.

It is noted that the term "security group" may generally be an abstraction that refers to a plurality of workloads that share one or more common characteristics, such as a common tag. Tags may be assigned arbitrarily but many use cases involve tagging workloads that serve similar functions, such as databases or web servers, with the same tag, so that the same security policies can be applied to them by virtue of having the same tag associated with them. In some embodiments, security groups are not explicitly defined on individual data centers, but are reflected in the creation of local security policies, such as firewall rules. For instance, if a universal security policy applies to a universal security group that is defined to include all workloads tagged with a particular name, USP manager 122 may create a firewall rule on remote data center 130 (e.g., through interaction with controller 136) that corresponds to the universal security policy and that applies to all workloads tagged with the particular name.

USP manager 122 continues to ensure the enforcement of universal security policies for workloads as circumstances change. For example, if a workload is migrated from a first data center to a second data center (e.g., if VM $135_1$ is migrated from remote data center 130 to on-prem data center 140), USP manager 122 ensures that any universal security groups and policies with which the workload is associated are also implemented at the second data center, such as through interaction with a controller of the second data center.

It is noted that, while FIG. 1 depicts data centers with virtual machines, techniques described herein may alternatively be implemented with other applicable types of data centers and devices, such as data centers with physical devices.

Techniques described herein constitute an improvement to conventional techniques for enforcing security policies for workloads, such as manually defining security policies at each individual data center to which workloads are deployed, as they allow for consistent, dynamic, and efficient enforcement of security policies without requiring users to learn and manually utilize the security frameworks of different types of data centers. Allowing users to define high-level, platform-agnostic security policies and security groups with dynamic membership criteria provides a level of convenience and uniformity of security that was not previously possible. The ability for an administrator to define a security policy once and have it enforced across different data centers despite changing circumstances, such as migration of workloads between data centers and changes to the workloads themselves, constitutes a major step forward in information security. As such, techniques described herein increase the overall security of data and thereby improve customer confidence.

Figure 2:
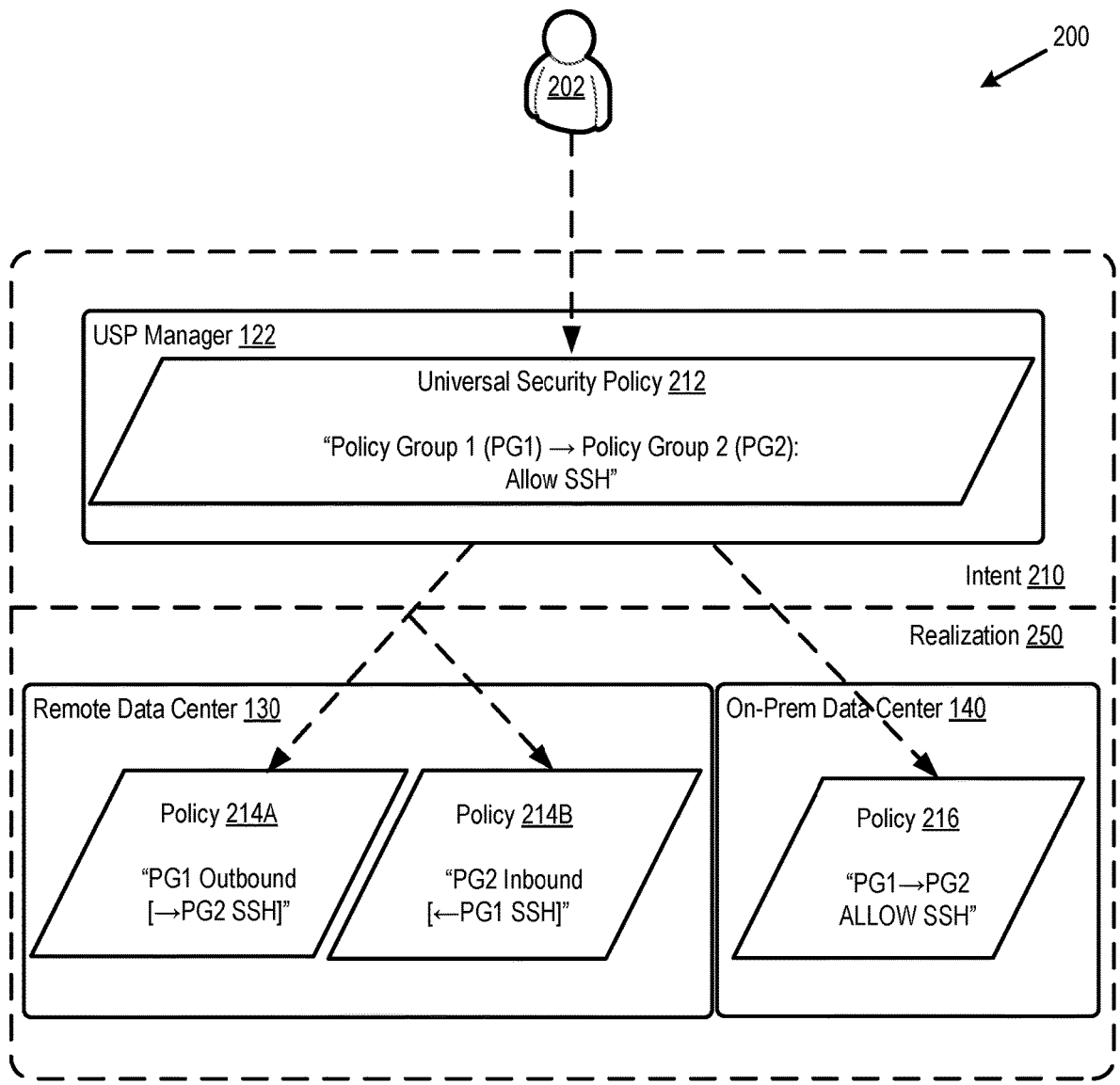
FIG. 2 illustrates an example of enforcing a universal security policy across data centers, according to embodiments of the present disclosure.

FIG. 2 illustrates an example 200 of enforcing a universal security policy across data centers, according to embodiments of the present disclosure. Example 200 includes USP manager 122, remote data center 130, and on-prem data center 140 of FIG. 1. Example 200 depicts a transition from an intent 210 phase, where a user's intent is defined as a universal security policy, to a realization 250 phase, where the universal security policy is implemented through local policies on data centers.

In the intent 210 phase of example 200, a user 202 (e.g., an administrator) provides a universal security policy 212 to USP manager 122, such as via a user interface. Universal security policy 212 comprises a platform-agnostic definition of a rule specifying "Policy Group 1 (PG1)→Policy Group 2 (PG2): Allow SSH," meaning that SSH communication is allowed from workloads belonging to a universal security group named "Policy Group 1" to workloads belonging to a universal security group named "Policy Group 2". For example, workloads may belong to these universal security groups by virtue of being tagged with "PG1" or "PG2".

In the realization 250 phase of example 200, USP manager 122 generates local policies on remote data center 130 and on-prem data center 140 that correspond to the universal security policy 212 defined in the intent 210 phase.

USP manager 122 directs a platform management device (e.g., controller 136 of FIG. 1) on remote data center 130 to generate a policy 214A specifying "PG1 Outbound [→PG2 SSH]", which may be a firewall rule specifying that outbound SSH communications from workloads in PG1 (e.g., workloads tagged with "PG1") to workloads in PG2 (e.g., workloads tagged with "PG2") are allowed. USP manager 212 further directs the platform management device on remote data center 130 to generate a policy 214B specifying "PG2 Inbound [←PG1 SSH]", which may be a firewall rule specifying that inbound SSH communications to workloads in PG2 from workloads in PG1 are allowed. Policies 214A-B may be generated using an API exposed by controller 136 of remote data center 130, and are based on the security framework of remote data center 130. For instance, controller 136 may create security policies through separate inbound and outbound firewall rules (e.g., stored in a firewall rules table), which may be enforced by firewall 118 of FIG. 1.

For on-prem data center 140, USP manager 122 directs a platform management device (e.g., a controller similar to controller 136 of FIG. 1) to generate policy 216 specifying "PG1→PG2 ALLOW SSH", which may be a firewall rule specifying that SSH communications are allowed from PG1 to PG2. Policy 216 may be generated using an API exposed by the platform management device of on-prem data center 140, and is based on the security framework of on-prem data center 140. For instance, and the platform management device of on-prem data center 140 may generate security policies as firewall rules (e.g., stored in a firewall rules table), and these rules may be enforced by a firewall of on-prem data center 140.

While example 200 depicts two separate outbound and inbound policies 214A and 214B being generated on remote data center 130, only one policy 216 is depicted as being generated for on-prem data center 140. This illustrates that different types of data centers may have different security frameworks, and security policies may be defined in different forms by platform management devices of different data centers. USP manager 122 is configured to interact with these platform management devices appropriately, such as through calls to particular APIs exposed by platform management devices of different types of data centers, in order to automatically generate security policies for individual data centers that correspond to universal security policies.

USP manager 122 may monitor policies 214A, 214B, and 216 over time, such as by requesting information from platform management devices of remote data center 130 and on-prem data center 140, in order to ensure that the local security policies continue to correspond to universal security policy 212. For example, if an administrator manually changes one of policies 214A, 214B, and 216 through interaction with a platform management device, USP manager 122 may determine that the policy needs to be automatically edited (or a new policy created) to ensure that universal security policy 212 is consistently enforced.

Furthermore, if a workload in PG1 or PG2 is migrated from a source data center to a destination data center, such as from remote data center 130 to on-prem data center 140, USP manager 122 automatically ensures that universal security policy 212 is enforced at the destination data center, such as through interaction with a platform management device of the destination data center. If a local security policy corresponding to universal security policy 212 already exists at the destination data center, such as policy 216 of on-prem data center 140, then USP manager 122 does not need to create a new local security policy. However, if no such local security policy exists, then USP manager 122 directs the platform management device of the destination data center to generate a local security policy, such as policy 216, that corresponds to universal security policy 212. As such, USP manager 122 automatically ensures consistent enforcement of universal security policies across multiple data centers.

Figure 3:
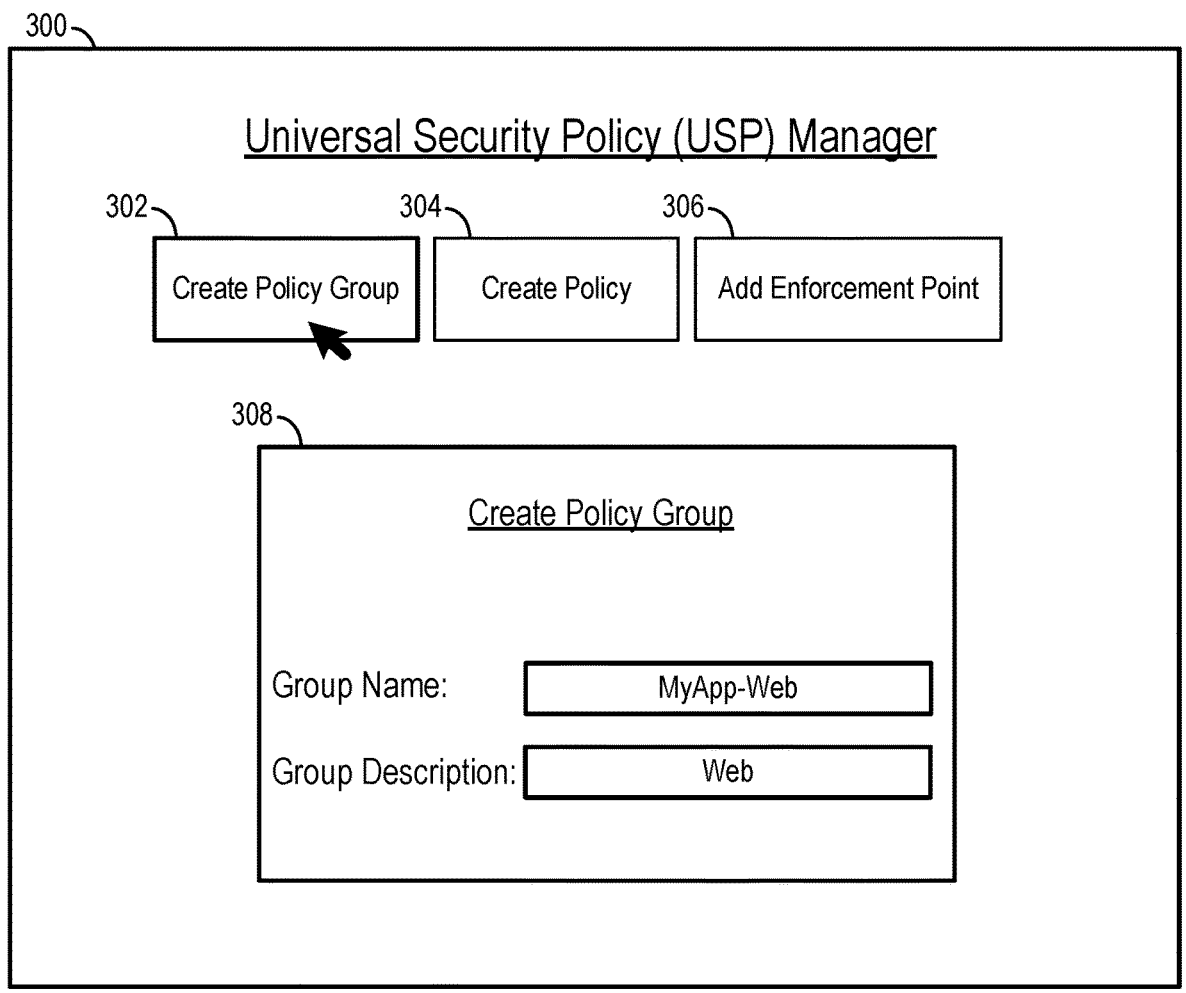
FIG. 3 illustrates an example user interface related to enforcing universal security policies across data centers, according to embodiments of the present disclosure.

FIG. 3 depicts an example user interface 300 related to enforcing universal security policies across data centers, according to embodiments of the present disclosure. For example, user interface 300 may be associated with USP manager 122 of FIGS. 1 and 2.

User interface 300 includes elements 302, 304, and 306 that allow a user to initiate processes for, respectively, creating a policy group, creating a policy, and adding an enforcement point. Window 308 is launched when a user selects element 302 to create a policy group. In window 308, a user is provided with user interface controls for specifying attributes of a universal security group. The "Group Name" attribute in window 308 refers to the name of the universal security group and the "Group Description" attribute in window 308 refers to a description of the universal security group. For instance, a workload may be associated with the universal security group named "MyApp-Web" by tagging the workload with the name "MyApp-Web". In other embodiments, window 308 may include additional or alternative attributes, such as different types of membership criteria for a universal security group.

Upon selecting element 304, the user may be presented with a different window that allows the user to specify a universal security policy, such as universal security policy 212 of FIG. 2. Similarly, selecting 306 may launch a window for adding an enforcement point, such as a data center at which universal security policies are to be enforced. A user interface for adding an enforcement point is depicted and described with respect to FIG. 4 below.

It is noted that user interface 300 is only included as an example, and other types of user interfaces and/or user interface components may be employed for techniques described herein.

Figure 4:
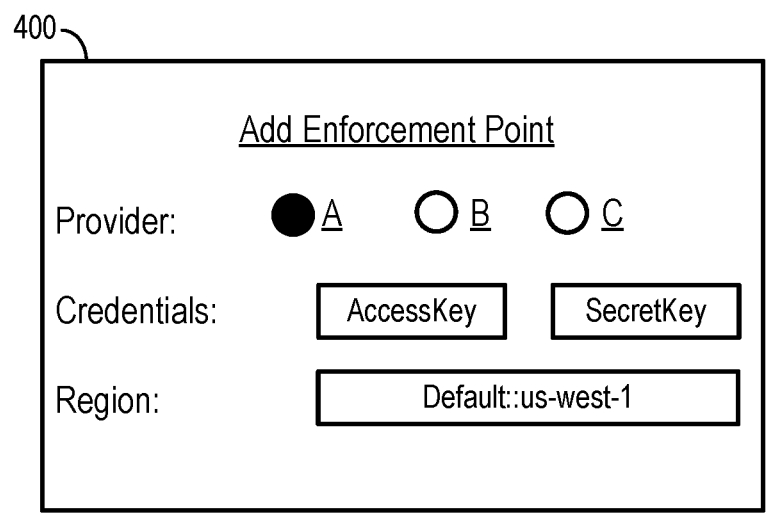
FIG. 4 illustrates an example user interface for adding enforcements points for universal security policies, according to embodiments of the present disclosure.

FIG. 4 illustrates an example user interface 400 for adding enforcements points for universal security policies, according to embodiments of the present disclosure. For instance, user interface 400 may be launched upon selecting element 306 of FIG. 3.

User interface 400 allows a user to specify information about an enforcement point for universal security policies. User interface 400 provides controls for specifying a "provider" for the enforcement point, which may refer to a type of data center. For instance "A" may refer to an AWS data center, "B" may refer to a VMware NSX® data center, and "C" may refer to a Microsoft Azure™ data center. These providers are only included as examples, and others may be included in user interface 400. Each provider may require different types of credentials. For instance, a data center of type "A" may require an access key, a secret key, and a region (e.g., representing a geographic area where security policies are to be enforced at the data center, which may in some embodiments be an optional input rather than a required input along with the credentials), whereas data centers of types "B" or "C" may require different credentials (e.g., username and password).

By providing credentials for a data center that is to be added as an enforcement point through user interface 400, the user allows USP manager 122 of FIGS. 1 and 2 to automatically be authenticated and establish a connection with a platform management device of the data center in order to direct the platform management device to perform actions such as generating security policies at the data center. As such, the user only enters credentials once at the time the data center is added as an enforcement point for USP manager 122. In certain embodiments, if USP manager 122 is unable to establish a connection with the platform management device of the data center based on the information provided by the user, the user may be presented with a notification that the connection failed and a prompt to enter different information.

It is noted that the user interface components depicted in FIGS. 3 and 4 are only included as examples. Additional user interface components may also be included, such as components for modifying security groups, policies, and enforcement points. User interfaces may also include information about workloads deployed to different data centers and security group membership of workloads. For instance, users may be able to view detailed information about how their universal security policies are being realized on different data centers, such as in the form of metrics or lists related to workloads.

Figure 5:
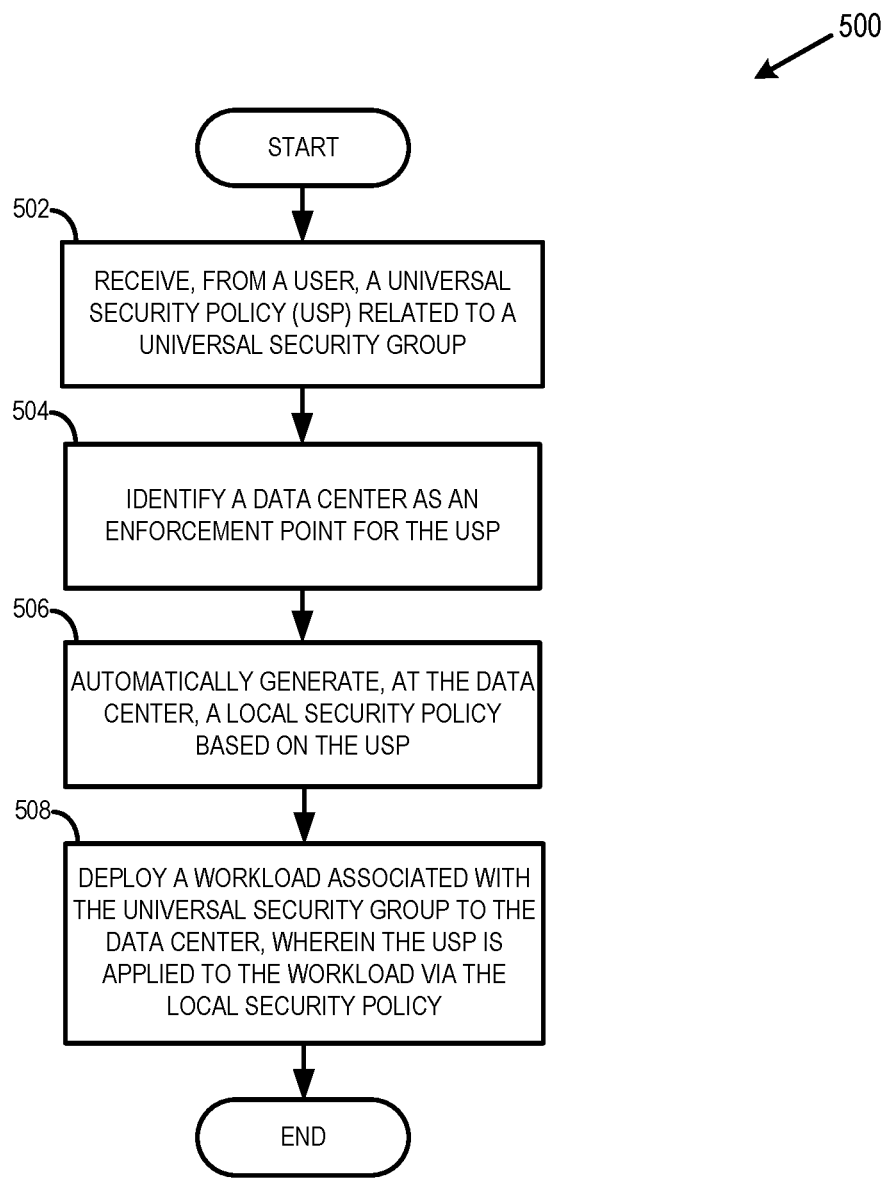
FIG. 5 illustrates example operations related to enforcing a universal security policy across data centers, according to embodiments of the present disclosure.

FIG. 5 illustrates example operations 500 related to enforcing a universal security policy across data centers, according to embodiments of the present disclosure. For example, operations 500 may be performed by USP manager 122 of FIGS. 1 and 2.

At 502, a universal security policy related to a universal security group is received from a user. For instance, a user may define the universal security policy by selecting element 304 of user interface 300 of FIG. 3. The universal security policy may, for example, include a communications rule.

At 504, a data center is identified as an enforcement point for the universal security policy. For example, USP manager 122 of FIGS. 1 and 2 may identify remote data center 130 of FIGS. 1 and 2 as an enforcement point.

At 506, a local security policy is automatically generated at the data center based on the universal security policy. For example, USP manager 122 of FIGS. 1 and 2 may automatically direct controller 136 of remote data center 130 of FIGS. 1 and 2 to generate the local security policy in accord with the universal security policy. The local security policy may specify the name of the universal security group such that the local security policy applies to workloads tagged with the name.

At 508, a workload associated with the universal security group (e.g., by being tagged with the name of the universal security group) is deployed to the data center, wherein the universal security policy is applied to the workload via the local security policy. For example, a workload deployed to remote data center 130 of FIGS. 1 and 2 may be tagged with the name of the universal security group, and so the local security policy may be applied to the workload accordingly.

Figure 6:
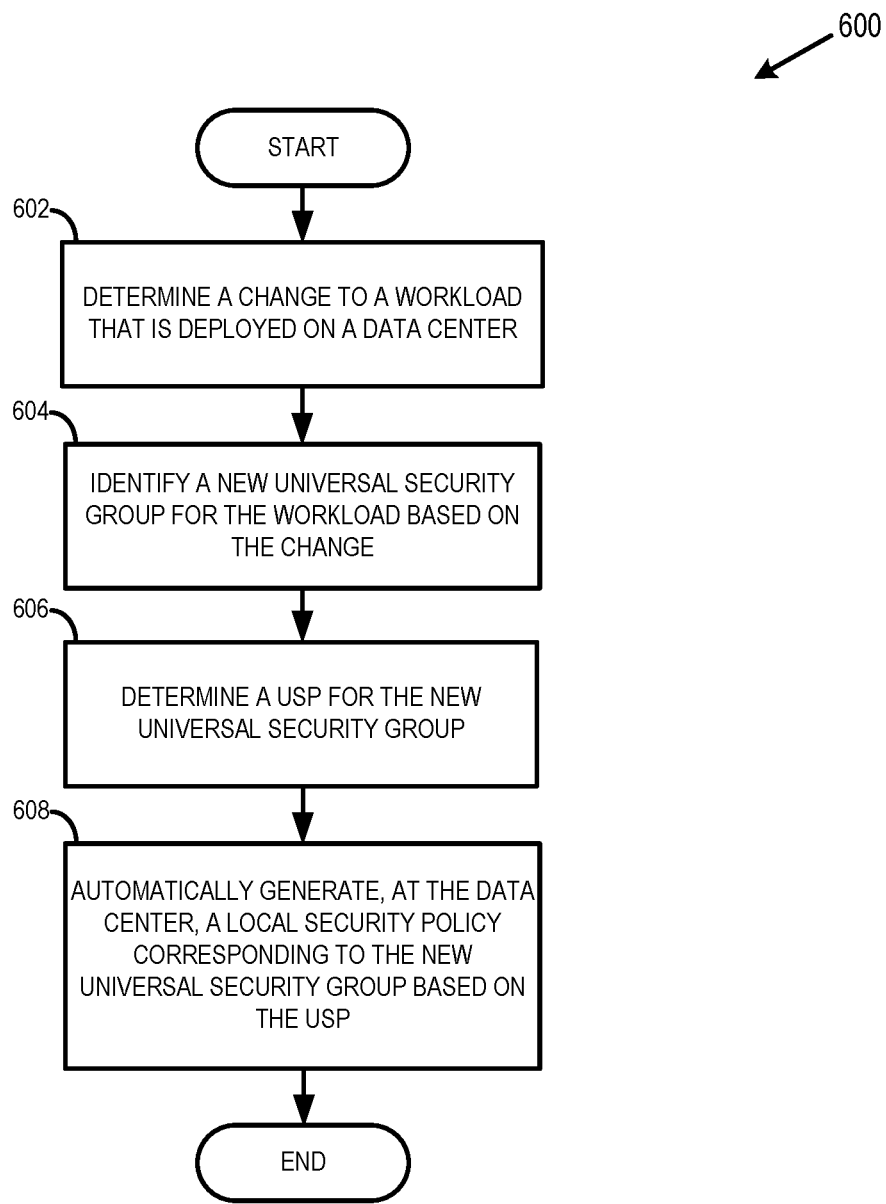
FIG. 6 illustrates additional example operations related to enforcing a universal security policy across data centers, according to embodiments of the present disclosure.

FIG. 6 illustrates additional example operations 600 related to enforcing a universal security policy across data centers, according to embodiments of the present disclosure. For example, operations 600 may be performed by USP manager 122 of FIGS. 1 and 2.

At 602, a change to a workload deployed on a data center is determined. For example, USP manager 122 of FIGS. 1 and 2 may determine that a tag associated with a workload has changed to identify a name of a different universal security group. In certain embodiments, USP manager 122 of FIGS. 1 and 2 checks workloads deployed at data centers for changes, such as tag changes, at regular intervals, upon occurrence of an event, etc.

At 604, a new universal security group for the workload is determined based on the change. For example, a tag of the workload may have been changed to identify the name of the new universal security group.

At 606, a universal security policy for the new universal security group is determined. For example, USP manager 122 of FIGS. 1 and 2 may determine that the user has defined a universal security policy for the new universal security group.

At 608, a local security policy corresponding to the new universal security group is automatically generated at the data center based on the universal security policy. For example, USP manager 122 of FIGS. 1 and 2 may instruct controller 136 of remote data center 130 of FIGS. 1 and 2 to generate the local security policy based on the universal security policy. The local security policy may specify the name of the new universal security group so that it will be applied to workloads tagged with the name. In other embodiments, if the local security policy already exists at the data center, it may not need to be generated. In some embodiments, USP manager 122 of FIGS. 1 and 2 ensures that any local security policies that applied to the workload at the data center prior to the change at 602 are no longer applied to the workload, such as by directing a platform management device to remove the local security policies at the data center (e.g., if the local security policies do not still apply to other workloads).

Operations 600 illustrate how techniques described herein allow for efficient and seamless enforcement of security policies on data centers despite changes over time. If security requirements for a workload change, a user only needs to update a tag associated with the workload to associate it with a different security group and different security policies regardless of the data center on which it is deployed. In other embodiments, universal security groups may be defined to include alternative dynamic membership criteria, such as membership criteria based on geographic region. In such cases, the USP manager regularly checks workload conditions and automatically updates local security policies at individual data centers accordingly.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in a non-transitory computer-readable medium of the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The computer readable media may be non-transitory. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method for enforcing universal security policies across data centers, comprising:

receiving, from a user, a first universal security policy (USP) related to a first universal policy group;

identifying a first data center and a second data center as enforcement points for the first USP;

automatically generating, at the first data center, a first local security policy based on the first USP;

automatically generating, at the second data center, a second local security policy based on the first USP, wherein the second local security policy is defined in a different form than the first local security policy;

deploying a workload associated with the first universal policy group to the first data center, wherein the first USP is enforced for the workload via the first local security policy; and deploying the workload or a second workload associated with the first universal policy group to the second data center, wherein the first USP is enforced for the workload or the second workload via the second local security policy.

2. The method of claim 1, further comprising:

determining a change to the workload;

identifying a second universal policy group for the workload based on the change;

determining a second USP that is associated with the second universal policy group; and automatically generating, at the first data center, a third local security policy based on the second USP.

3. The method of claim 1, wherein deploying the workload to the second data center comprises:

migrating the workload from the first data center to the second data center.

4. The method of claim 1, further comprising receiving credentials for the first data center provided by the user, wherein automatically generating, at the first data center, the first local security policy based on the first USP comprises using the credentials to complete an authentication process with a platform management device of the first data center.

5. The method of claim 1, further comprising determining that the workload is associated with the first universal policy group based on metadata associated with the workload.

6. The method of claim 1, further comprising determining that the workload is associated with the first universal policy group based on a dynamic membership criterion of the first universal policy group.

7. The method of claim 1, wherein the first USP comprises a rule related to secure shell communications between the first universal policy group and a second universal policy group.

8. A non-transitory computer readable medium comprising instructions to be executed in a computer system, wherein the instructions when executed in the computer system perform a method for enforcing universal security policies across data centers, the method comprising:

receiving, from a user, a first universal security policy (USP) related to a first universal policy group;

identifying a first data center and a second data center as enforcement points for the first USP;

automatically generating, at the first data center, a first local security policy based on the first USP;

automatically generating, at the second data center, a second local security policy based on the first USP, wherein the second local security policy is defined in a different form than the first local security policy;

deploying a workload associated with the first universal policy group to the first data center, wherein the first USP is enforced for the workload via the first local security policy; and deploying the workload or a second workload associated with the first universal policy group to the second data center, wherein the first USP is enforced for the workload or the second workload via the second local security policy.

9. The non-transitory computer readable medium of claim 8, wherein the method further comprises:
determining a change to the workload;
identifying a second universal policy group for the workload based on the change;
determining a second USP that is associated with the second universal policy group; and
automatically generating, at the first data center, a third local security policy based on the second USP.

10. The non-transitory computer readable medium of claim 8, wherein deploying the workload to the second data center comprises:
migrating the workload from the first data center to the second data center.

11. The non-transitory computer readable medium of claim 8, wherein the method further comprises receiving credentials for the first data center provided by the user, wherein automatically generating, at the first data center, the first local security policy based on the first USP comprises using the credentials to complete an authentication process with a platform management device of the first data center.

12. The non-transitory computer readable medium of claim 8, wherein the method further comprises determining that the workload is associated with the first universal policy group based on metadata associated with the workload.

13. The non-transitory computer readable medium of claim 8, wherein the method further comprises determining that the workload is associated with the first universal policy group based on a dynamic membership criterion of the first universal policy group.

14. The non-transitory computer readable medium of claim 8, wherein the first USP comprises a rule related to secure shell communications between the first universal policy group and a second universal policy group.

15. A computer system comprising:
a memory; and
at least one hardware processor configured to execute system software for the computer system to cause the at least one processor to execute a method for enforcing universal security policies across data centers, the method comprising:
receiving, from a user, a first universal security policy (USP) related to a first universal policy group;
identifying a first data center as an enforcement point for the first USP;
automatically generating, at the first data center, a first local security policy based on the first USP; and
deploying a workload associated with the first universal policy group to the first data center, wherein the first USP is enforced for the workload via the first local security policy.

16. The computer system of claim 15, wherein the method further comprises:
determining a change to the workload;
identifying a second universal policy group for the workload based on the change;
determining a second USP that is associated with the second universal policy group; and
automatically generating, at the first data center, a second local security policy based on the second USP.

17. The computer system of claim 15, wherein the method further comprises:
migrating the workload from the first data center to a second data center; and
automatically generating, at the second data center, a second local security policy based on the first USP.

18. The computer system of claim 15, wherein the method further comprises receiving credentials for the first data center provided by the user, wherein automatically generating, at the first data center, the first local security policy based on the first USP comprises using the credentials to complete an authentication process with a platform management device of the first data center.

19. The computer system of claim 15, wherein the method further comprises determining that the workload is associated with the first universal policy group based on metadata associated with the workload.

20. The computer system of claim 15, wherein the method further comprises determining that the workload is associated with the first universal policy group based on a dynamic membership criterion of the first universal policy group.

* * * * *